(12) United States Patent
Chen et al.

(10) Patent No.: US 10,409,316 B1
(45) Date of Patent: Sep. 10, 2019

(54) KEY DEVICE

(71) Applicant: Chicony Electronics Co., Ltd., New Taipei (TW)

(72) Inventors: Chia-Hsin Chen, New Taipei (TW); Mitsuo Horiuchi, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/276,067

(22) Filed: Feb. 14, 2019

Related U.S. Application Data (60) Provisional application No. 62/728,882, filed on Sep. 10, 2018.

(30) Foreign Application Priority Data

Oct. 17, 2018 (TW) .............................. 107136612 A (51) Int. Cl.
| | |
|---|---|
| *H01H 13/705* | (2006.01) |
| *G05G 5/05* | (2006.01) |
| *G06F 3/02* | (2006.01) |
| *G05G 1/02* | (2006.01) |
| H01H 13/7065 | (2006.01) |
| B41J 5/16 | (2006.01) |
| B41J 5/14 | (2006.01) |
| B41J 5/12 | (2006.01) |

(52) U.S. Cl.
CPC ................. *G05G 5/05* (2013.01); *G05G 1/02* (2013.01); *G06F 3/0202* (2013.01); *B41J 5/12* (2013.01); *B41J 5/14* (2013.01); *B41J 5/16* (2013.01); *G05G 2505/00* (2013.01); *H01H 13/705* (2013.01); *H01H 13/7065* (2013.01)

(58) Field of Classification Search
None
See application file for complete search history.

(56) References Cited

U.S. PATENT DOCUMENTS

| 4,430,531 A * | 2/1984 | Wright ............... H01H 13/7006 200/275 |
| 5,763,841 A * | 6/1998 | Hasunuma ........... H01H 13/705 200/5 A |

(Continued)

FOREIGN PATENT DOCUMENTS

| TW | M468767 U | 12/2013 |
| TW | I608329 B | 12/2017 |

*Primary Examiner* — Jill E Culler
(74) *Attorney, Agent, or Firm* — Muncy, Geissler, Olds & Lowe, P.C.

(57) ABSTRACT

A key device includes a substrate having an assembling area, a keycap, and a restoring member. A pivot coupling member and an elastic arm are provided in the assembling area. The pivot coupling member has a pivot axis, and the elastic arm is extending in a direction parallel to the pivot axis. The elastic arm includes a limiting member protruding out of the substrate. The keycap is disposed above the assembling area. A connection arm is extending from the keycap and includes a pivot portion pivoted with the pivot coupling member, so that the keycap is swingable relative to the substrate. The keycap further includes a limiting groove for detachably fitted with the limiting member. The restoring member is disposed between the substrate and the keycap. The restoring member is adapted to provide a restoring force for swinging the keycap relative to the substrate.

11 Claims, 8 Drawing Sheets

(56) References Cited

U.S. PATENT DOCUMENTS 8,772,661 B2 * 7/2014 Liang .................... H01H 3/122
200/341
2004/0195082 A1 * 10/2004 Takeda ................. H01H 13/705
200/343

* cited by examiner

KEY DEVICE

CROSS-REFERENCES TO RELATED APPLICATIONS

This application claims the priority benefit of U.S. provisional application Ser. No. 62/728,882, filed on Sep. 10, 2018 and Patent Application No. 107136612 filed in Taiwan, R.O.C. on Oct. 17, 2018. The entirety of the above-mentioned patent applications are hereby incorporated by references herein and made a part of the specification.

BACKGROUND

Technical Field

The instant disclosure relates to an input device, in particular, to a key device.

Related Art

Keys are one of the common input devices for electronic devices. For instance, keys are provided on the keyboard or the touch panel of a notebook computer, and the user can press the keys to allow corresponding signal(s) to be generated.

Various keys are available on the market. For swing-type keys, a swing-type key known to the inventor(s) includes a keycap and a base, one side of the keycap is pivoted with the base, so that the keycap is swingable relative to the base to perform raising or lowering movements. Moreover, the bottom portion of the keycap further includes a first assembling member, and the base includes a second assembling member corresponding to the first assembling member. Therefore, during the assembly of the swing-type key, the keycap is swung to allow the first assembling member to come close to the second assembling member, so that the second assembling member can be assembled with the first assembling member for limiting the second assembling member.

SUMMARY

However, in the swing-type key known to the inventor(s), the first assembling member is assembled with the second assembling member by swinging the keycap. As a result, during the assembling or disassembling procedures, the first assembling member and the second assembling member may interfere or compress with each other (i.e., apply force to each other), thereby causing the damage of the second assembling member.

In view of this, in one embodiment, a key device is provided and the key device comprises a substrate, a keycap, and a restoring member. The substrate comprises an upper surface having an assembling area. A pivot coupling member and an elastic arm are provided in the assembling area. The pivot coupling member has a pivot axis, and the elastic arm is extending in a direction parallel to the pivot axis. An end portion of the elastic arm comprises a limiting member protruding out of the upper surface. The keycap is disposed above the assembling area. A connection arm is extending from one side of the keycap, and the connection arm comprises a pivot portion pivoted with the pivot coupling member, so that the keycap is swingable relative to the substrate in a first pivot direction by taking the pivot axis as an axis. A bottom portion of the keycap further comprises a limiting groove for correspondingly and detachably fitted with the limiting member, so that the keycap is limited in a radial direction of the pivot axis. The restoring member is disposed between the substrate and the keycap. The restoring member is adapted to provide a restoring force for swinging the keycap relative to the substrate in a second pivot direction opposite to the first pivot direction.

As above, according to the key device of one or some embodiments of the instant disclosure, the elastic arms of the substrate are extending in the direction parallel to the pivot axis of the pivot coupling members. Therefore, during assembling or disassembling the keycap, when the limiting groove is interfered with the limiting member, the elastic arm can perform a suitable deflection or swing movement to drive the limiting member to move, so that the limiting member can be prevented from being forced by an excessive force and can be prevented from being damaged. Furthermore, as compared with the key known to the inventor(s), the key device according to one or some embodiments of the instant disclosure can omit the connecting member (e.g., the scissor component) for guiding the keycap to perform raising and lowering movements. Therefore, the key device according to one or some embodiments of the instant disclosure has the advantages of simplified structure, easy assembling, and reduced cost. Furthermore, the weight and the thickness of the key device can be reduced to allow the product having the key device to be lightweight and thin.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
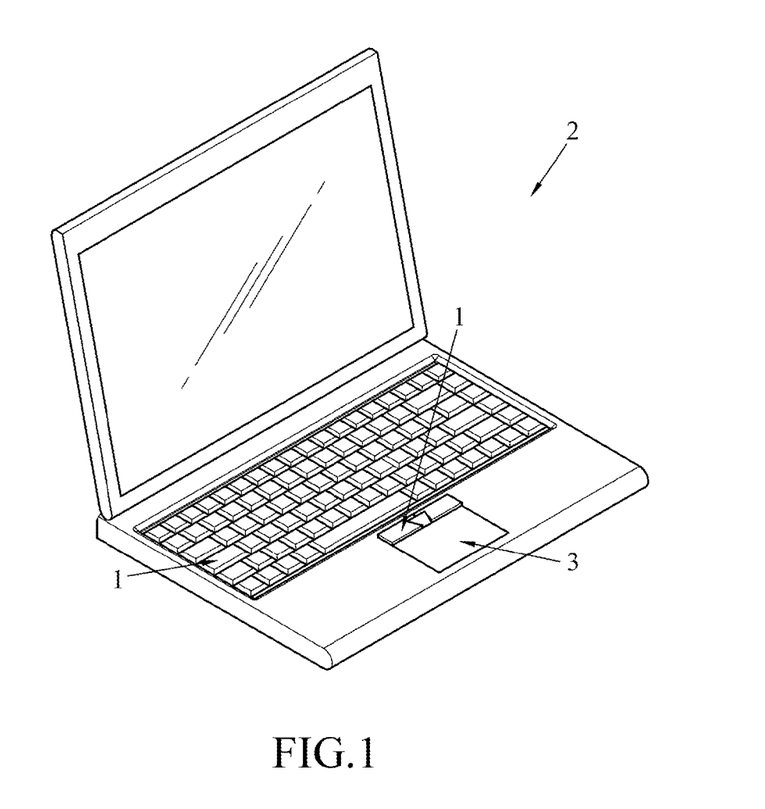
FIG. 1 illustrates a schematic application view of a key device according to a first embodiment of the instant disclosure.
Figure 2:
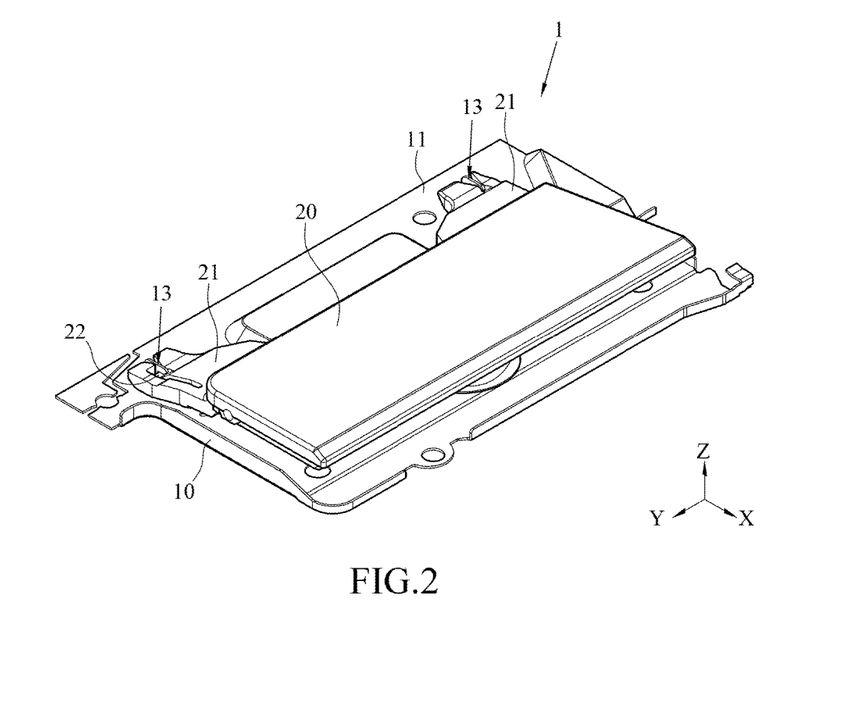
FIG. 2 illustrates a perspective view of the key device of the first embodiment.

As shown in FIGS. 1 and 2, in this embodiment, the key device 1 comprises a substrate 10, a keycap 20, and a restoring member 30. The key device 1 may be applied to different electronic devices, e.g., laptops, notebook computers, or the input devices of other electronic devices, so that the user can press the key device 1 to allow corresponding signal(s) to be generated. For example, in this embodiment, the key device 1 may be the key of the keyboard of a notebook computer 2, so that users can input texts, symbols, instructions, etc., to the notebook computer 2 via pressing the key device 1. Alternatively, the key device 1 may be the key of the touch pad 3 of the notebook computer 2, so that the user can select or draw object(s), or open menus on the window, etc., by pressing the key device 1, but embodiments are not limited thereto.

Figure 3:
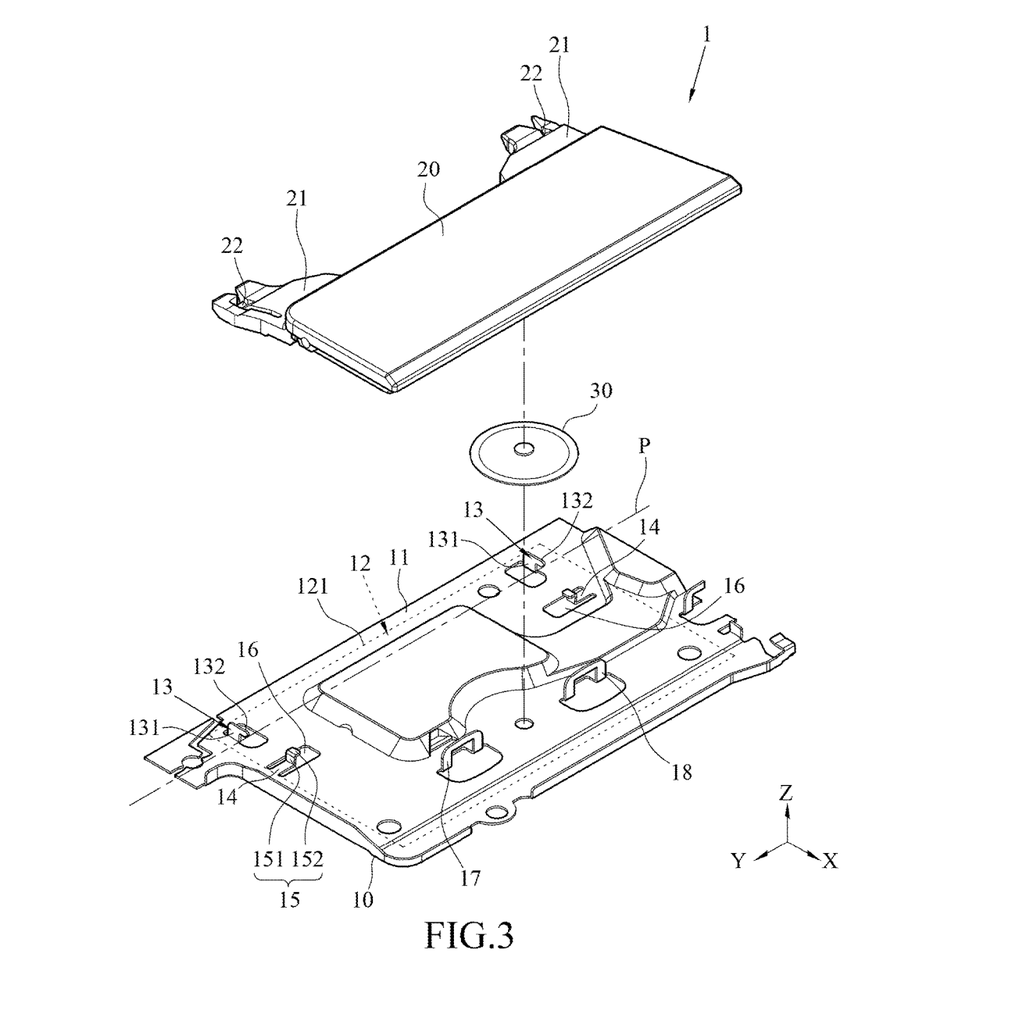
FIG. 3 illustrates an exploded view of the key device of the first embodiment.

As shown in FIGS. 2 and 3, the substrate 10 may be a rigid plate made of metal material(s) (e.g., iron, aluminum, or alloy) or plastic material(s). The substrate 10 has an upper surface 11, and the upper surface 11 has an assembling area 12. The assembling area 12 is an area of the substrate 10 for assembling the keycap 20 (for example, in FIG. 3, the assembling area 12 is indicated by a frame with dashed line). Moreover, in this embodiment, two pivot coupling members 13 and two elastic arms 14 are provided in the assembling area 12. The two pivot coupling members 13 near a side portion 121 of the assembling area 12, and the two pivot coupling members 13 are spaced apart from each other (in this embodiment, the two pivot coupling members 13 are spaced apart from each other in the Y-axis direction). Similarly, the two elastic arms 14 are spaced apart from each other in the Y-axis, and a distance between the side portion 121 and the elastic arm 14 is greater than a distance between the side portion 121 and the pivot coupling member 13 (that is, the two elastic arms 14 are much farther from the side portion 121 of the assembling area 12, as compared with the two pivot coupling members 13), but embodiments are not limited thereto, the two elastic arms 14 may be located at different lines. Furthermore, an end portion of each of the elastic arms 14 comprises a limiting member 15 protruding out of the upper surface 11 for assembling with the keycap 30. It is understood that the foregoing embodiments are provided for illustrative purposes, not limitations to the instant disclosure; the number of the pivot coupling member 13 and the number of the elastic arm 14 may be changed according to actual requirements. For instance, the key device 1 may have one or more than two pivot coupling members 13 and elastic arms 14.

As shown in FIG. 3, the two pivot coupling members 13 of the substrate 10 have a pivot axis P. In this embodiment, the pivot axis P is parallel to the Y-axis. Therefore, when the corresponding structures of the keycap 20 are pivoted with the two pivot coupling members 13, the keycap 20 can swing relative to the substrate 10 to perform raising or lowering movements; detailed descriptions are provided in the following paragraphs. In this embodiment, each of the pivot coupling members 13 comprises a pivot hook 131 integrally extending upwardly and bent from the substrate 10, and a hook piece 132 is laterally extending from a top portion of the pivot hook 131. In this embodiment, the hook piece 132 is laterally extending toward the elastic arm 14 (i.e., the X-axis direction), but embodiments are not limited thereto. In some embodiments, the pivot coupling members 13 may be a bearing housing or a shaft end support (not shown).

Figure 4:
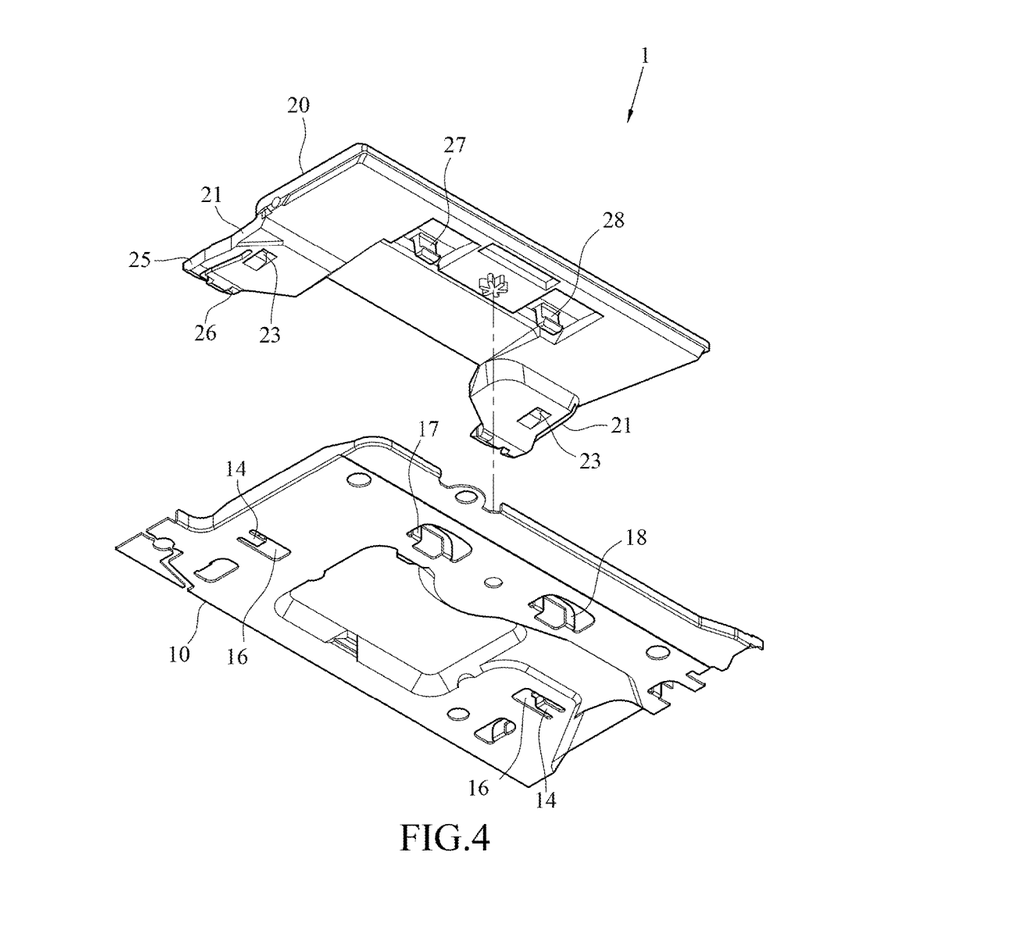
FIG. 4 illustrates another exploded view of the key device of the first embodiment.
Figure 5:
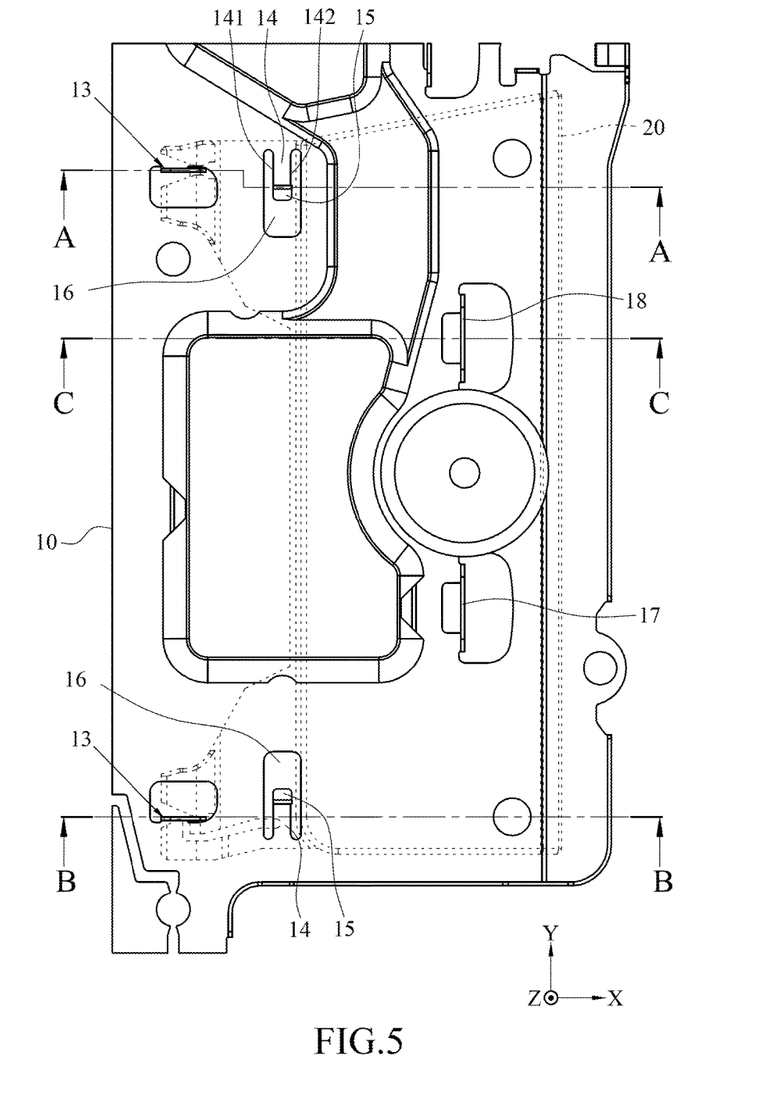
FIG. 5 illustrates a partial top view of the key device of the first embodiment.

As shown in FIGS. 3 to 5, it is understood that, in FIG. 5, the keycap 20 is omitted for clearly showing the structure of the substrate 10. Each of the elastic arms 14 of the substrate 10 is extending in a direction parallel to the pivot axis P (i.e., the Y-axis direction). For example, as shown in FIG. 5, in this embodiment, the substrate 10 comprises two through holes 16, the two elastic arms 14 are respectively in the two through holes 16, and the two elastic arms 14 are integrally extending and bent from the substrate 10; each of the elastic arms 14 and the corresponding through hole 16 may be formed by, for instance, stamping techniques. Moreover, each of the elastic arms 14 has a first side edge 141 and a second side edge 142. The first side edge 141 and the second side edge 142 are respectively located at two opposite sides of the elastic arm 14 in an extending direction (i.e., the Y-axis direction), and the first side edge 141 and the second side edge 142 are respectively spaced apart from the edges of the respective through holes 16. Therefore, when each of the elastic arms 14 is forced, such configuration allows the forced elastic arm 14 to have a space to perform a deflection, but embodiments are not limited thereto. In some embodiments, each of the elastic arms 14 may be integrally extending and bent from the upper surface 11 of the substrate 10.

Further, as shown in FIGS. 3 to 5, in this embodiment, each of the limiting members 15 at the end portion of the corresponding elastic arm 14 comprises a standing plate 151 and a lateral plate 152. The standing plate 151 is integrally extending upwardly and bent from the end portion of the elastic arm 14, and the lateral plate 152 is integrally extending and bent from a top portion of the standing plate 151, so that each of the limiting members 15 forms an L-shaped structure. However, it is understood that this embodiment is provided as an illustrative purpose, but not a limitation to the instant disclosure. In some embodiments, each of the limiting members 15 may be bent to have other shapes (for instance, the limiting member 15 may be of a U shape or a Z shape, or the limiting member 15 may be the standing plate 151 to have an I shape structure). Alternatively, each of the limiting members 15 may be a block and fixed at the end portion of the corresponding elastic arm 14, embodiments are not limited thereto.

Figure 6:
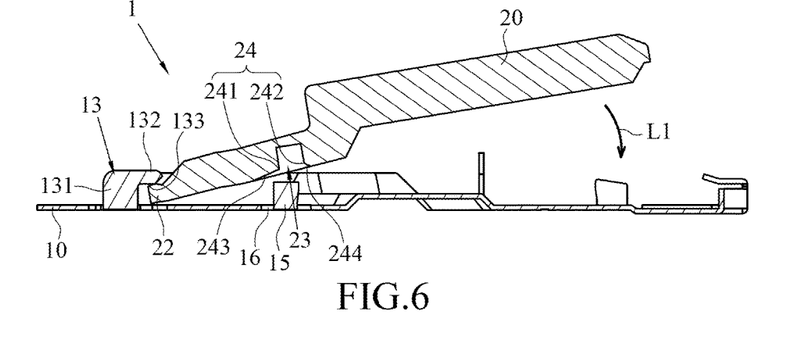
FIG. 6 illustrates a schematic assembled view of the key device of the first embodiment.

As shown in FIGS. 2 and 3, the keycap 20 is disposed above the assembling area 12. Two connection arms 21 are extending from one side of the keycap 20 for corresponding to the two pivot coupling members 13. An end portion of each of the connection arms 21 comprises a pivot portion 22. In this embodiment, the two pivot portions 22 are pivoted with the two pivot coupling members 13, respectively. In this embodiment, each of the pivot portions 22 is a crossbar extending in the Y-axis direction. Hence, the axial direction of the crossbar is the same as the pivot axis P of the pivot coupling member 13. Furthermore, each of the pivot portions 22 is further abutted against and pivoted with the lower edge 133 of the hook piece 132 of the corresponding pivot hook 131 (as shown in FIG. 6), so that the keycap 20 is swingable relative to the substrate 10 in a first pivot direction by taking the pivot axis P as the axis. Moreover, a bottom portion of the keycap 20 further comprises two limiting grooves 23 correspondingly and detachably fitted with the two limiting members 15. Therefore, the keycap 20 is at least limited in a radial direction of the pivot axis P, where the radial direction is a direction perpendicular to the pivot axis P (for example, the radial direction is the X-axis direction shown in FIGS. 2 and 3).

As shown in FIG. 3, the restoring member 30 is disposed between the substrate 10 and the keycap 20. The restoring member 30 is adapted to provide a restoring force for swinging the keycap 20 relative to the substrate 10 in a second pivot direction opposite to the first pivot direction. In this embodiment, the restoring member 30 is a metal dome abutted against the bottom portion of the keycap 20. In this embodiment, the restoring member 30 is near one side of the keycap 20 and said one side of the keycap 20 is far away from the pivot coupling member 13, but embodiments are not limited thereto. When the keycap 20 is pressed, the keycap 20 is swung downwardly by taking the pivot axis P as the axis to come close to the substrate 10 and to press the restoring member 30 for storing the restoring force. A circuit board (not shown) may be disposed on the top or the bottom of the substrate 10, and the circuit board may be a printed circuit board (PCB), a flexible printed circuit board (FPCB), a Rigid-Flex PCB, or other types of circuit boards. Therefore, when the restoring member 30 is pressed, the restoring member 30 triggers the circuit board to generate the corresponding signal(s). Conversely, when the keycap 20 is released, the keycap 20 is swung upwardly by taking the pivot axis P as the axis and moved back to the original unpressed position of the keycap 20. In some embodiments, the restoring member 30 may be a rubber dome, a metal pin, a spring, a mechanical switch, a magnetic member, or other components capable of providing the restoring force, embodiments are not limited thereto.

As above, according to the key device 1 of one or some embodiments of the instant disclosure, the elastic arms 14 of the substrate 10 are extending in the direction parallel to the pivot axis P of the pivot coupling members 13. Therefore, during assembling or disassembling the keycap 20, when the limiting groove 23 is interfered with the limiting member 15, the elastic arm 14 can perform a suitable deflection or swing movement to drive the limiting member 15 to move, so that the limiting member 15 can be prevented from being forced by an excessive force and can be prevented from being damaged. Furthermore, as compared with the key known to the inventor(s), the key device 1 according to one or some embodiments of the instant disclosure can omit the connecting member (e.g., the scissor component) for guiding the keycap 20 to perform raising and lowering movements. Therefore, the key device 1 according to one or some embodiments of the instant disclosure has the advantages of simplified structure, easy assembling, and reduced cost. Furthermore, the weight and the thickness of the key device 1 can be reduced to allow the product having the key device 1 to be lightweight and thin; the details are described in the following paragraphs with aids of the figures.

Figure 7:
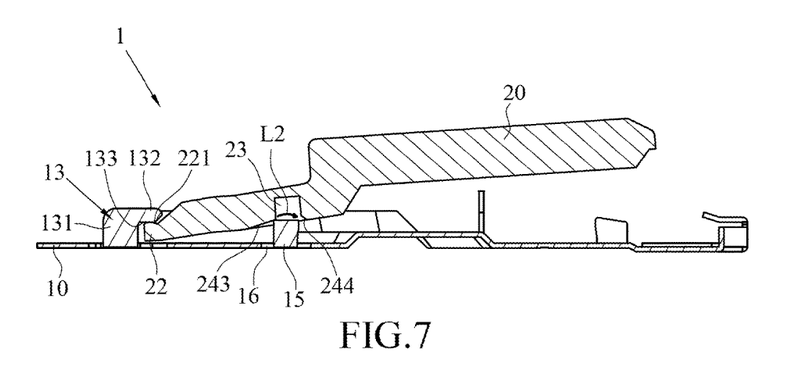
FIG. 7 illustrates a schematic operational view of the key device of the first embodiment.
Figure 8:
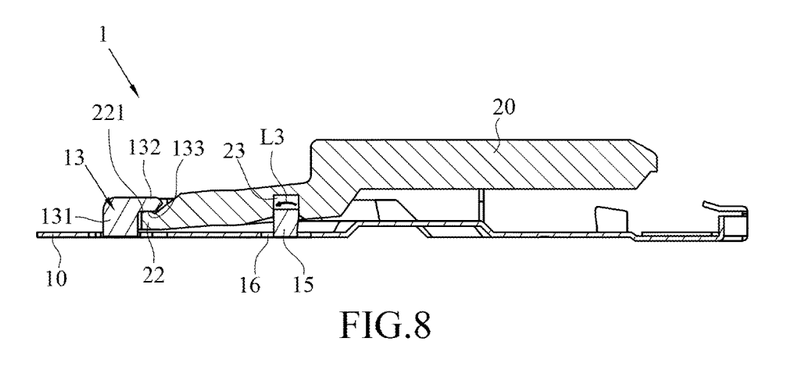
FIG. 8 illustrates a sectional view of FIG. 5 along line A-A.

As shown in FIG. 6, during assembling the keycap 20 with the substrate 10, the two pivot portions 22 of the keycap 20 are firstly pivoted with the two pivot coupling members 13 of the substrate 10, and then the keycap 20 is swung toward the substrate 10 (as indicated by the arrow L1 shown in FIG. 6) by taking the pivot axis P (as shown in FIG. 3) as the axis. As shown in FIGS. 5 and 7, since the keycap 20 comes close to the substrate 10 by swinging, a portion of the bottom portion of the keycap 20 adjacent to the limiting groove 23 firstly abuts against the limiting member 15 at the end portion of the elastic arm 14 and thus having interference with the limiting member 15. Next, since the elastic arm 14 of the key device 1 according to one or some embodiments of the instant disclosure is extending in the direction parallel to the pivot axis P of the pivot coupling members 13, when the keycap 20 is further forced downwardly, the elastic arm 14 is forced to perform a suitable deflection or swing movement away from the pivot coupling members 13 (as indicated by the arrow L2 shown in FIG. 7) to drive the limiting member 15 to move, so that the limiting member 15 can be prevented from being forced by an excessive force and can be prevented from being damaged, and the limiting groove 23 can be fitted with the limiting member 15. As shown in FIGS. 5 and 8, during fitting the limiting groove 23 with the limiting member 15, since the interfering force of the keycap 20 applied to the limiting member 15 gradually decreases, the elastic arm 14 gradually deflects or swings back toward the pivot coupling member 13 (as indicated by the arrow L3 shown in FIG. 8), so that the limiting groove 23 is detachably fitted with the limiting member 15 to allow the keycap 20 to be limited at least in the X-axis direction. Specifically, in one embodiment, the keycap 20 can be limited at least at two directions by the limiting member 15 to prevent the keycap 20 from tilting while still allowing the keycap 20 to be swung relative to the limiting member 15 to perform the raising and lowering movements.

As shown in FIGS. 5 and 8, when the keycap 20 is to be detached from the substrate 10, the keycap 20 can be swung away from the substrate 10 by taking the pivot axis P as the axis (as shown in FIG. 3). Since the keycap 20 moves away from the substrate 10 by swinging, the inner wall of the limiting groove 23 of the keycap 20 abuts against the limiting member 15 at the end portion of the elastic arm 14 and thus having interference with the limiting member 15. When the keycap 20 is further forced upwardly, the elastic arm 14 is forced to perform a suitable deflection or swing movement toward the pivot coupling members 13 (as indicated by the arrow L3 shown in FIG. 8) to drive the limiting member 15 to move, so that the limiting member 15 can be prevented from being forced by an excessive force and can be prevented from being damaged, and the limiting groove 23 can be detached from the limiting member 15 for subsequent disassembling procedures. Moreover, when the limiting groove 23 is detached from the limiting member 15, the elastic arm 14 can deflect or swing back toward a direction away from the pivot coupling member 13 (as indicated by the arrow L2 shown in FIG. 7).

Further, as shown in FIG. 6, in one embodiment, the opening 24 of the limiting groove 23 at the bottom portion of the keycap 20 has a first edge 241 and a second edge 242 opposite to the first edge 241. A distance between the first edge 241 and the pivot coupling member 13 is less than a distance between the second edge 242 and the pivot coupling member 13 (namely, the first edge 241 is much closer to the pivot coupling member 13, as compared with the second edge 242). The first edge 241 has a guiding surface 243, and the second edge 242 has a guiding surface 244. In this embodiment, the two guiding surfaces 242, 244 are respectively at the bottom portion of the keycap 20 and connected to the first edge 241 and the second edge 242. Therefore, during assembling or disassembling the keycap 20, the guiding surfaces 243, 244 can guide the elastic arms 14 to perform a suitable deflection or swing movement smoothly. In some embodiments, the lengths or the slopes of the two guiding surfaces 243, 244 may be configured according to actual requirements. For example, as shown in FIG. 6, in this embodiment, the length of the guiding surface 243 is greater than the length of the guiding surface 244, and the slope of the guiding surface 243 is less than the slope of the guiding surface 244.

Furthermore, as shown in FIGS. 7 and 8, in one embodiment, each of the pivot portions 22 of the keycap 20 may have a curved top surface 221, and the curved top surface 221 of the pivot portion 22 is abutted against the lower edge 133 of the hook piece 132 of the pivot coupling member 13. Therefore, when the keycap 20 is swung relative to the substrate 10 by using the pivot portion 22 as the pivot center, the interference between the pivot portion 22 and the pivot hook 131 can be reduced by the curved top surface 221, so that the keycap 20 can have smooth raising or lowering movements.

Figure 9:
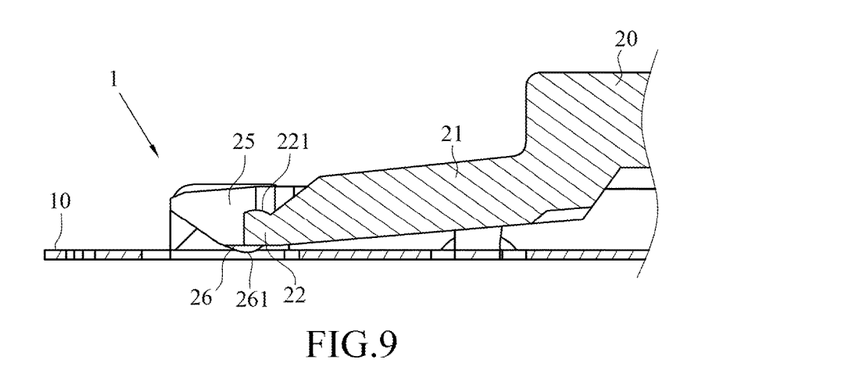
FIG. 9 illustrates a partial sectional of FIG. 5 along line B-B.

As shown in FIGS. 4 and 9, in one embodiment, an extension portion 25 may be further extending from each of the connection arms 21 of the keycap 20, and each of the extension portions 25 is extending away from the corresponding limiting groove 23. A protruding block 26 is provided on an end portion of each of the extension portions 25, and the protruding block 26 is abutted against the upper surface 11 of the substrate 10. In other words, the protruding block 26 of each of the extension portions 25 of the keycap 20 is much farther from the limiting groove 23, as compared with the corresponding pivot portion 22 of the connection arm 21. Accordingly, since the protruding block 26 is downwardly abutted against the upper surface 11 of the substrate 10, the keycap 20 can prevent from being swung upwardly and detached from the substrate 10 easily when the keycap 20 is not pressed.

Furthermore, as shown in FIG. 9, in one embodiment, the protruding block 26 of each of the extension portions 25 of the keycap 20 may have a curved bottom surface 161, and the curved bottom surface 161 of the protruding block 26 is abutted against the upper surface 11 of the substrate 10. Therefore, when the keycap 20 is swung relative to the substrate 10 by using the pivot portion 22 as the pivot center, the interference between the protruding block 26 and the substrate 10 can be reduced by the curved bottom surface 161, so that the keycap 20 can have smooth raising or lowering movements.

Figure 10:
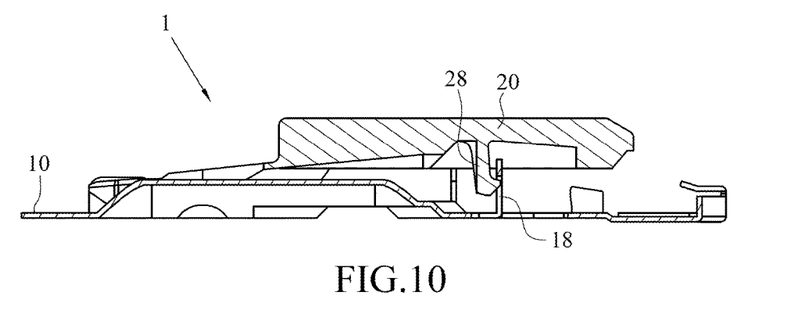
FIG. 10 illustrates a sectional view of FIG. 5 along line C-C.

As shown in FIGS. 3, 4, and 10, the assembling area 12 of the substrate 10 further comprises a first retaining member 17 and a third retaining member 18; the first retaining member 17 and the third retaining member 18 are located at opposite sides of the side portion 121 of the assembling area 12, but embodiments are not limited thereto. In this embodiment, the first retaining member 17 and the third retaining member 18 are spaced apart from each other (in this embodiment, the first retaining member 17 and the third retaining member 18 are spaced apart from each other in the Y-axis direction). Moreover, the first retaining member 17 and the third retaining member 18 may be hooks (here, the hooks are of a U shape, but may be of an L shape) integrally extending upwardly and bent from the substrate 10. Conversely, the bottom portion of the keycap 20 further comprises a second retaining member 27 and a fourth retaining member 28. In this embodiment, the second retaining member 27 and the fourth retaining member 28 are reverse hooks integrally protruding from the bottom portion of the keycap 20 for corresponding engaging with the first retaining member 17 and the third retaining member 18. Therefore, the keycap 20 can prevent from being swung upwardly and detached from the substrate 10 easily when the keycap 20 is not pressed. In some embodiments, the first retaining member 17 and the third retaining member 18 may be reverse hooks integrally protruding from the upper surface 11 of the substrate 10, and the second retaining member 27 and the fourth retaining member 28 may be hooks integrally protruding from the bottom portion of the keycap 20, but embodiments are not limited thereto.

Moreover, as shown in FIG. 3, in one embodiment, the restoring member 30 may be located between the first retaining member 17 and the third retaining member 18, so that the restoring member 30 can be further limited by the first retaining member 17 and the third retaining member 18 and can prevent from being deflected.

Figure 11:
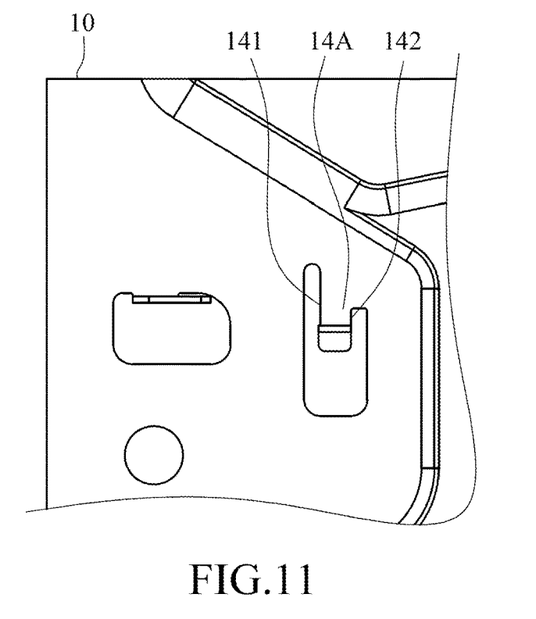
FIG. 11 illustrates a partial top view of a key device according to a second embodiment of the instant disclosure.
Figure 12:
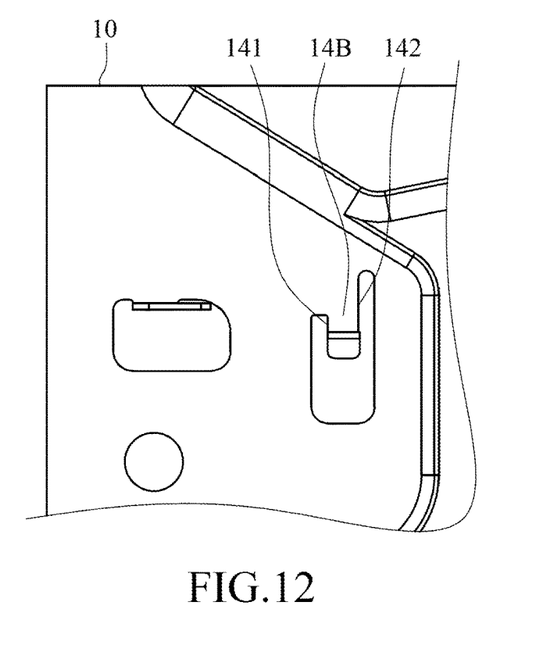
FIG. 12 illustrates a partial top view of a key device according to a third embodiment of the instant disclosure.

In some embodiments, the length of the first side edge 141 and the length of the second side edge 142 of each of the elastic arms 14 of the substrate 10 may be the same or different. Hence, when the elastic arms 14 are forced, different flexible displacements can be performed by the elastic arms 14. For example, as shown in FIG. 5, regarding the elastic arm 14 in this embodiment, the length of the first side edge 141 and the length of the second side edge 142 are the same. Alternatively, as shown in FIG. 11, regarding the elastic arm 14A in this embodiment, the length of the first side edge 141 is greater than the length of the second side edge 142. Alternatively, as shown in FIG. 12, regarding the elastic arm 14B in this embodiment, the length of the first side edge 141 is less than the length of the second side edge 142.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A key device, comprising:
   a substrate comprising an upper surface, wherein the upper surface has an assembling area; a pivot coupling member and an elastic arm are provided in the assembling area, the pivot coupling member has a pivot axis, and the elastic arm is extending in a direction parallel to the pivot axis; an end portion of the elastic arm comprises a limiting member protruding out of the upper surface;
   a keycap disposed above the assembling area, wherein a connection arm is extending from one side of the keycap, the connection arm comprises a pivot portion pivoted with the pivot coupling member, so that the keycap is swingable relative to the substrate by taking the pivot axis as an axis; a bottom portion of the keycap further comprises a limiting groove correspondingly and detachably fitted with the limiting member, so that the keycap is limited in a radial direction of the pivot axis; and
   a restoring member disposed between the substrate and the keycap, the restoring member is adapted to provide a restoring force to the keycap.

2. The key device according to claim 1, wherein the limiting member comprises a standing plate integrally extending upwardly and bent from the end portion of the elastic arm.

3. The key device according to claim 2, wherein the limiting member further comprises a lateral plate integrally extending and bent from a top portion of the standing plate.

4. The key device according to claim 1, wherein the elastic arm has a first side edge and a second side edge, the first side edge and the second side edge are respectively located at two opposite sides of the elastic arm in an extending direction of the elastic arm, and a length of the first side edge is different from a length of the second side edge.

5. The key device according to claim 1, wherein the limiting groove has an opening, the opening has a first edge and a second edge opposite to the first edge, a distance between the first edge and the pivot coupling member is less than a distance between the second edge and the pivot coupling member; the first edge comprises a guiding surface, or the second edge comprises another guiding surface, or the first edge comprises a first guiding surface and the second edge comprises a second guiding surface.

6. The key device according to claim 1, wherein the pivot coupling member comprises a pivot hook, a hook piece is laterally extending from a top portion of the pivot hook, the hook piece has a lower edge, and the pivot portion is abutted against and pivoted with the lower edge.

7. The key device according to claim 6, wherein the pivot portion has a curved top surface, the curved top surface of the pivot portion is abutted against the lower edge of the hook piece.

8. The key device according to claim 1, wherein an extension portion is further extending from the connection arm; a protruding block is provided on an end portion of the extension portion, and the protruding block is abutted against the upper surface of the substrate.

9. The key device according to claim 8, wherein the protruding block has a curved bottom surface, and the curved bottom surface of the protruding block is abutted against the upper surface of the substrate.

10. The key device according to claim 1, wherein the assembling area of the substrate further comprises a first retaining member, the bottom portion of the keycap further comprises a second retaining member, and the first retaining member is correspondingly engaged with the second retaining member.

11. The key device according to claim 10, wherein the assembling area of the substrate further comprises a third retaining member, the bottom portion of the keycap further comprises a fourth retaining member, the third retaining member is correspondingly engaged with the fourth retaining member, and the restoring member is located between the first retaining member and the third retaining member.

* * * * *